(12) United States Patent
Chudoba

(10) Patent No.: US 7,014,370 B2
(45) Date of Patent: Mar. 21, 2006

(54) BARE FIBER OPTICAL CONNECTING DEVICES

(75) Inventor: Paul S. Chudoba, Shohola, PA (US)

(73) Assignee: NuVisions International, Inc., Milford, PA (US)

( * ) Notice: Subject to any disclaimer, the term of this patent is extended or adjusted under 35 U.S.C. 154(b) by 0 days.

(21) Appl. No.: 10/828,968

(22) Filed: Apr. 21, 2004

(65) Prior Publication Data

US 2004/0258365 A1    Dec. 23, 2004

Related U.S. Application Data

(60) Provisional application No. 60/466,022, filed on Apr. 25, 2003.

(51) Int. Cl.
*G02B 6/36* (2006.01)

(52) U.S. Cl. .............................. 385/84; 385/78; 385/92
(58) Field of Classification Search .................. 385/78, 385/84, 92

See application file for complete search history.

(56) References Cited

U.S. PATENT DOCUMENTS

| 4,448,483 | A | * | 5/1984 | Ryley, Jr. ..................... 385/68 |
| 4,836,637 | A | * | 6/1989 | Poorman et al. .............. 385/60 |
| 5,113,464 | A | * | 5/1992 | Wall ............................ 385/81 |

* cited by examiner

*Primary Examiner*—Michelle Connelly-Cushwa
*Assistant Examiner*—Rhonda S. Peace
(74) *Attorney, Agent, or Firm*—George R. McGuire; Bond, Schoeneck & King, PLLC

(57) ABSTRACT

A quick connect fiber optic connector assembly for testing and communication that uses a modified ferrule having a reservoir formed into its tip for holding optic transmitting gel or oil. A cleaved optical fiber may be held concentrically within the ferrule for alignment with a receiver or optical device. The gel or oil in the reservoir alleviates the need for a perfect cleave of the fiber and allows for transmission of the optic signal. If necessary, the pressure foot of the connector assembly may be rotated to minimize transmission losses. When the transmission signal is optimized, the fiber may be tested or used for communications. In another embodiment of the invention, a connector assembly includes a removable cartridge housing optical coupling compound. As a bare fiber is passed into the connector it picks up a small quantity of coupling compound and is then interconnected to an optical patch cable.

8 Claims, 3 Drawing Sheets

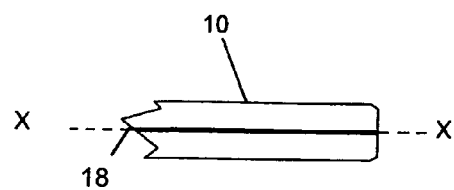 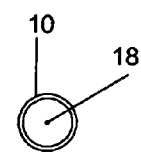
Fig. 1A    Fig. 1B
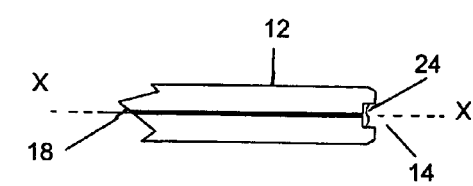 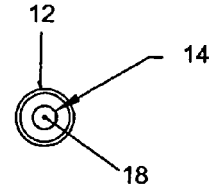
Fig. 2A    Fig. 2B
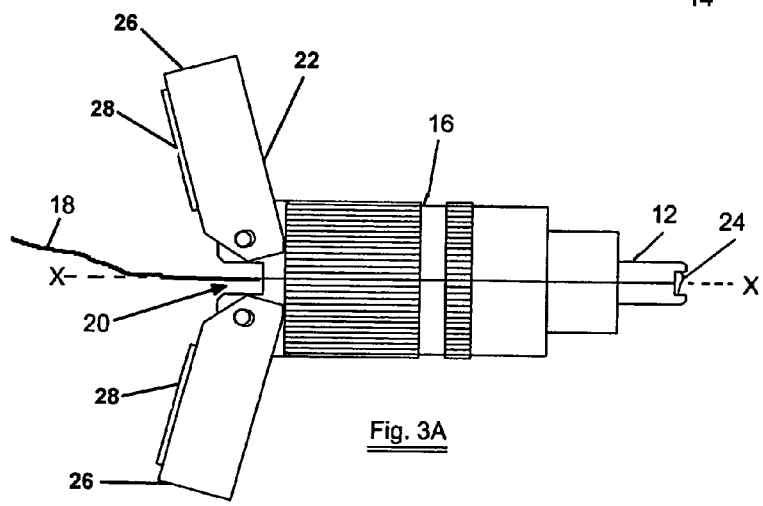 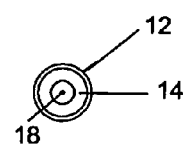
Fig. 3A    Fig. 3B
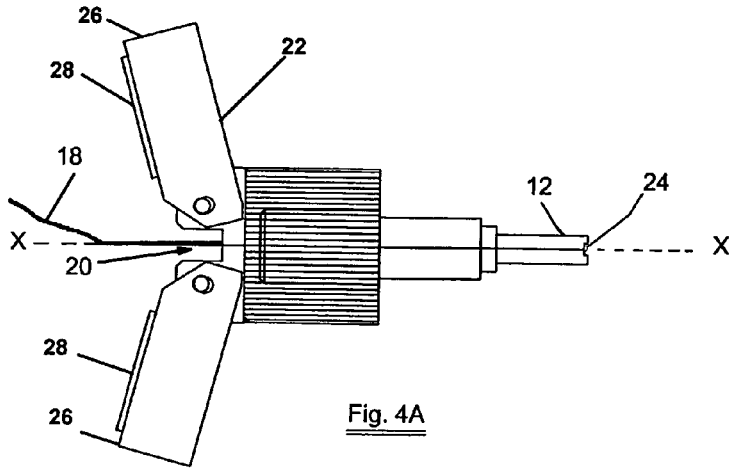 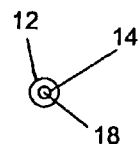
Fig. 4A    Fig. 4B

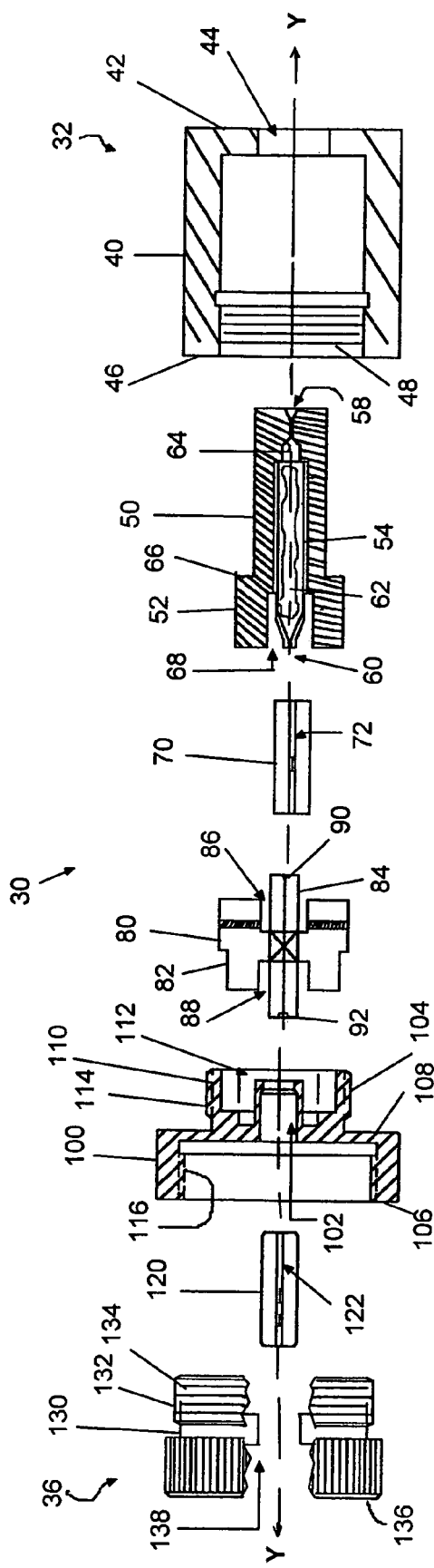
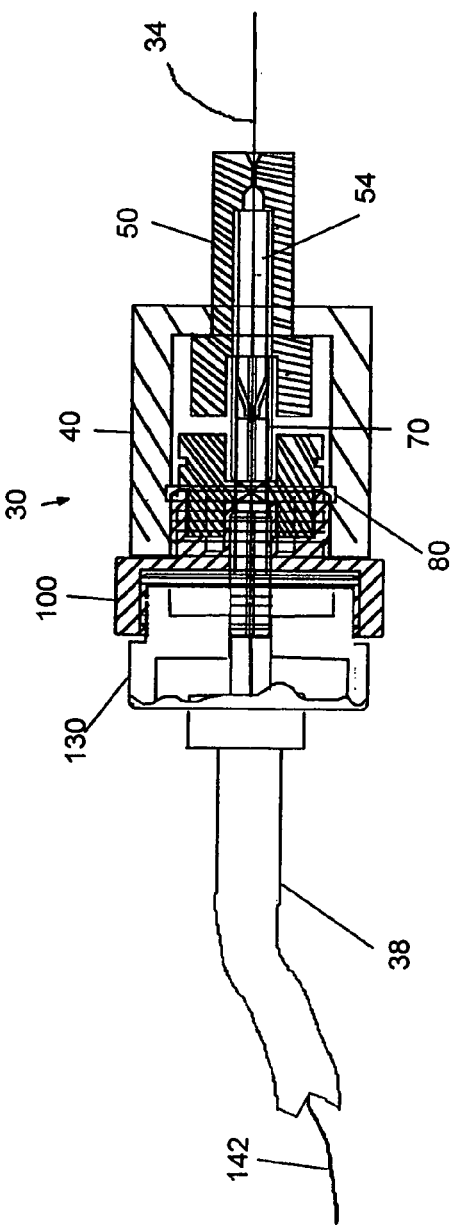
Fig. 5
Fig. 6

BARE FIBER OPTICAL CONNECTING DEVICES

CROSS-REFERENCE TO RELATED APPLICATION

The present application claims priority to U.S. Provisional Application Ser. No. 60/466,022, filed Apr. 25, 2003 and entitled Ferrule Reservoir for Bare Fiber Optic Cables, hereby incorporated by reference.

BACKGROUND OF THE INVENTION

1. Field of Invention

The present invention relates to fiber optic connectors and, more specifically, to ferrules for connecting bare fiber optic interfaces to test, measurement, and connection equipment.

2. Description of Prior Art

The fiber optic industry often requires a connection to bare fibers in order to test transmission capabilities or establish communications. Currently, a special tool called a cleaver is used to provide a clean break on the end of a bare fiber so that it may be connected to a specially designed bare fiber adapter. It is difficult and time consuming, however, to provide a perfect cleave. As a result, there are devices that can quickly connect to the bare end of the cable while maintaining high-quality transmissions.

In order to remedy the disadvantages of a cleaved cable, some systems use a V-shaped groove that is manually filled with an oil or gel. A highly polished bare fiber connected to testing or communication equipment is placed at one end of the groove. The fiber to be tested is stripped and inserted into the other end of the V-shaped groove until it optimizes with the polished bare fiber at the other end. The V-shaped groove aligns the fibers and the oil/gel improves the quality of the link. These systems are very expensive, bulky, and are not user-friendly when employed in the field. In addition to requiring a manual application of the oil or gel, conventional systems are also disadvantageous because the oil or gel is exposed to the contaminants in the environment, such as dust and debris.

3. Objects and Advantages

It is a principal object and advantage of the present invention to provide a fiber optic connector that is inexpensive and easy to use in the field.

It is an additional object and advantage of the present invention to provide a fiber optic connector that avoid the need for a perfect cleave in order to work effectively.

It is a further object and advantage of the present invention to provide a connector that improves the quality of an optic link.

Other objects and advantages of the present invention will in part be obvious, and in part appear hereinafter.

SUMMARY OF THE INVENTION

In accordance with the foregoing object and advantages, the present invention comprises a quick connect fiber optic connector assembly including a ferrule having a reservoir for holding optical coupling compound, such as a transmitting gel or oil. A cleaved optical fiber is concentrically held within the ferrule for alignment with a receiver. The gel or oil in the reservoir alleviates the need for a perfect cleave of the fiber and improves the quality of the optic link. By releasing a pressure foot of the connector assembly, the fiber may be rotated to minimize transmission losses. The pressure foot consists of special material that is sandwiched around the bare fiber to provide a definite holding mechanism for the bare fiber. Once the transmission signal is optimized, the fiber can tested or used for or communications.

In another embodiment, the present invention comprises a connector including an enclosed cartridge housing the optical coupling compound. As a bare cable is inserted into the connector it passes through the cartridge and picks up a small quantity of coupling compound before engaging a ferrule. The ferrule includes a small divot for accepting the fiber and compound thereon, and optically interconnects the bare fiber to a patch cable or equipment lead positioned in the opposing side of the ferrule. The cartridge isolates the coupling compound from the environment and provides an easy and mess-free method of applying the oil or gel to the cable interface.

BRIEF DESCRIPTION OF THE DRAWINGS

The present invention will be more fully understood and appreciated by reading the following Detailed Description in conjunction with the accompanying drawings, in which:

FIGS. 1A and 1B are a cross-section and an end view, respectively, of a conventional ferrule used in fiber optic connectors;

FIGS. 2A and 2B are a cross-section and an end view, respectively, of a ferrule having a reservoir according to the present invention;

FIGS. 3A and B are a side view and an end view, respectively, of a fiber optic connector with bare fiber clamping mechanism including a ferrule and reservoir according to the present invention;

FIGS. 4A and 4B are a side view and an end view, respectively, of a universal ferrule with bare fiber clamping mechanism having a reservoir according to the present invention;

FIG. 5 is an exploded cross-section of another embodiment of a connector according to the present invention;

FIG. 6 is a cross-section of another embodiment of a connector according to the present invention.

DETAILED DESCRIPTION

Figure 7:
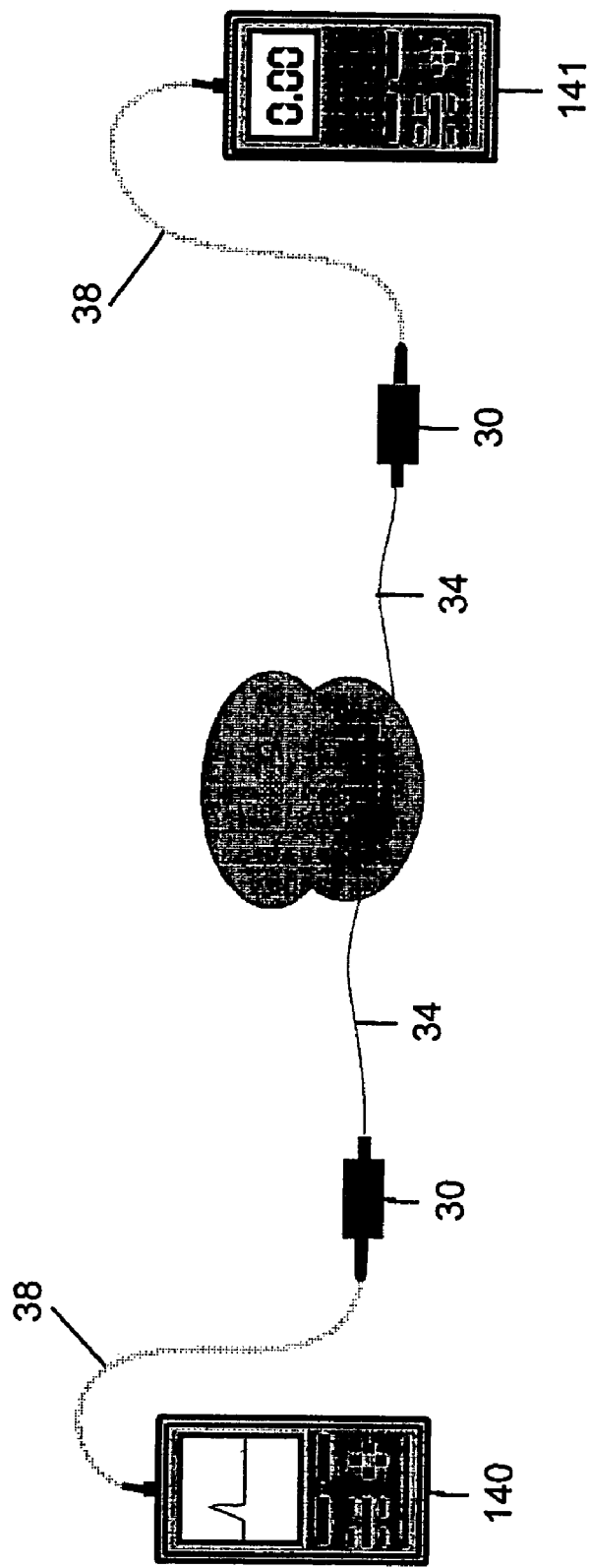
FIG. 7 is a schematic of the present invention as used for testing bare fibers.

Referring to the drawings wherein like numerals refer to like parts throughout, there is seen in FIGS. 1A and 1B a conventional fiber optic ferrule 10 used in connectors and adapters for accepting bare fibers.

As seen in FIGS. 2A and 2B, a ferrule 12 extending along a longitudinal axis X—X includes a recess or cavity formed at one end of the ferrule that defines a reservoir 14. Reservoir 14 is concentrically positioned about axis X—X and adapted to retain an optical gel or oil 24 therein that aids in the transmission of the light through connector. The gel or oil is a conventional optical coupling compound for normal operating conditions.

As seen in FIGS. 3A and 3B, ferrule 12 including reservoir 14 can be provided in a conventional bare fiber adapter 16. In order to make a quick connection, a bare fiber 18 is cleaved and inserted into the receiving end of adapter 16 through a bore 20 formed along longitudinal axis X—X until it reaches end of bore 20 and terminates at reservoir 14. A pressure foot or clamping mechanism 22 may be included in adaptor 16 to retain fiber 18 therein, such as that described in U.S. Pat. No. 5,818,993, hereby incorporated by reference. Claming mechanism 22 comprises a pair of opposing jaws 26 that may be releasably closed to clamp bare fiber 18. Jaws 26 preferably include pads 28 for safely engaging fiber 18. Ferrule 12 has a specific hole size (typically in microns) for the fiber and has very tight tolerances regarding concentricity to insure proper alignment of bare fiber 18 along axis X—X.

Oil or gel 24 contained within reservoir 14 serves as an optical transmission medium between fiber 18 and any testing or optical equipment connected to adaptor 16. The transmission capability of gel 24 is such that it is unnecessary to perfectly cleave the end of fiber 18. The positioning of reservoir 14 in the tip of ferrule 12 provides for the retention of the oil or gel 24 when ferrule 12 is joined to optical testing or communication equipment. By releasing grasp on fiber 18 via releasing clamping mechanism 22, fiber 18 may be axially rotated until any transmission losses are minimized, as determined by optical testing equipment such as an optical time domain reflectometer (OTDR). Once the signal quality has been optimized, the fiber can be fixed in place by re-engaging pressure foot 22 and the system can be tested or used for communications.

As seen in FIGS. 3A and 3B, reservoir 14 can be used in conjunction with various fiber-optic connectors regardless of the type of housing requirements or diameters, such as ST, SC, LC, MU, HMS, and DIN. Ferrule 12 can be made of plastic, stainless steel or zirconium.

The present invention may also be used in connection with a singlemode or multimode universal ferrule, such as the Bullet QuickShot® connector manufactured by Fiber Plus International, Milford, Pa., and more fully described in U.S. Pat. Nos. 5,818,993 and 5,751,874, hereby incorporated by reference. As seen in FIGS. 4A and 4B, a single mode universal ferrule connector assembly modified to include ferrule 12 and reservoir 14 provides the mechanism for retaining a bare fiber 18. Gel or oil 24 is then applied to the end face of ferrule 12 to fill reservoir 14. A patch cable 38 (two fiber optic polished connectors attached to a fiber optic cable) with a universal mating sleeve, such as Quick link® or LiteLock® zirconium sleeve with a universal housing manufactured by Fiber Plus International, Milford, Pa., is next attached to the end of the single mode universal ferrule assembly. Bare fiber 18 is stripped of its coating and inserted in the end of the bare fiber adapter until it goes through the connector assembly and ferrule 12 and stops at the end of the patch cable. If necessary, clamping mechanism 22 is opened enough to allow bare fiber 18 to be rotated until the losses are minimized using an OTDR. Once the signal losses are optimized, jaws 26 of clamping mechanism 22 are closed to retain fiber 18 in a fixed position so that the system can then be tested or used for communications.

Referring to FIGS. 5 and 6, another embodiment of the present invention comprises a bare fiber connector 30 including an optical coupling compound that is protected from the environment. Connector 30 extends along a longitudinal axis Y—Y from a rearward end 32 adapted for accepting a bare fiber 34, to a forward end 36 adapted for interconnection to a fiber optic patch cable 38 or equipment port.

Connector 30 includes an end cap 40 comprising a hollow cylinder including a shoulder 42 formed at the rearward end 32 of connector 30 and an opening 44 concentric about axis Y—Y formed through shoulder 42. Forward end 46 of cap 40 has a larger internal diameter than the diameter of opening 44 and includes threads 48 formed on an inner surface thereof.

Connector 30 further includes an optical coupling cartridge 50 comprising an outer housing 52 and an inner chamber 54. Inner chamber 54 extends along axis Y—Y from an entrance aperture 58 at rearward end 32 of connector 30 to an exit aperture 60 facing forward end 36 of connector 30. Inner chamber 54 further includes an optical coupling compound 62 contained therein, such as a conventional optical gel or oil. Entrance aperture 58 and exit aperture 60 each preferably have a diameter of about 260 microns for accepting standard optical fibers having buffer diameters of 245 microns (+/−10 microns). Due to the small diameters of entrance aperture 58 and exit aperture 60, relatively viscous coupling compound 62 generally will not leak out of cartridge 50. Entrance aperture 58 may include a barb 64 extending circumferentially about axis Y—Y to facilitate the wicking or removal of excess coupling compound if a bare fiber 34 is withdrawn from cartridge 50 through entrance aperture 60. Outer housing 52 includes a shoulder 66 that defines an annular cavity 68 extending axially around inner chamber 54 that opens toward forward end 36 of connector 30.

Connector 30 also includes a cartridge sleeve 70 extending along axis Y—Y and having a longitudinal expansion slot 72 formed through the sidewall thereof that extends parallel to axis Y—Y, thereby allowing for resilient expansion of the internal diameter of sleeve 70.

Connector 30 further includes a ferrule assembly 80 comprising an inner post 84 aligned along axis Y—Y and an outer housing 82 axially surrounding inner post 84 in spaced relation thereto. Housing 82 and inner post 84 define opposing chambers 86 and 88 extending concentrically about axis Y—Y and inner post 82. Inner post 84 includes divots 90 and 92 formed at either end that are in axial alignment with axis Y—Y and optically interconnected.

Connector 30 also includes a bulkhead housing 100 having an axial bore 102 extending along axis Y—Y. Housing 100 includes a smaller diameter portion 104 and a larger diameter portion 106 interconnected by a shoulder 108. Housing 30 further includes a tubular wall 110 extending rearwardly along axis Y—Y and circumferentially around smaller diameter portion 106 to define a rearwardly opening chamber 112. The outer surface of wall 110 includes threads 114. The inner surface of larger diameter portion 106 also includes a set of threads 116.

Connector 30 further includes a taper sleeve 120 comprising a bushing having a longitudinal slot 122 formed therein and extending along an axis parallel to axis Y—Y to allow for radial expansion of sleeve 120. Sleeve 120 preferably has a slight taper in either direction, i.e., toward forward end 36 of connector 30, and toward rearward end 32 of connector 30.

Connector 30 also includes a universal interface 130 having a rearward portion 132 with threads 134 formed thereon and a forward portion 136 for receiving a conventional optical patch cable 38 or for interconnection to testing or other optical communication equipment. Interface 130 further includes an inner bore 138 extending along axis Y—Y that preferably has a slight taper toward forward end 32 of connector 30.

Connector 30 is assembled by fitting end cap 40 over cartridge 50 until shoulder 66 of cartridge 50 abuts shoulder 42 of end cap 40 and a portion of cartridge 50 extends through opening 44. Cartridge sleeve 70 is interference fit into annular cavity 68 of cartridge 50 and releaseably engages the forward end of inner chamber 54. Sleeve 70 also releaseably engages inner post 84 of ferrule 80, thereby axially aligning exit aperture 60 of cartridge 50 with divot 90 of inner post 84 of ferrule 80 along axis Y—Y.

Inner post 90 of ferrule 80 is inserted into axial bore 102 of bulkhead housing 100 and retained by friction. End cap 40 is threadably engaged to housing 100 via corresponding internal threads 48 of cap 40 and external threads 114 of wall 100 of housing 100. Taper sleeve 120 is inserted into the forwardly facing side of housing 100 and universal interface 130 engaged with housing 100 via threads 116 and 134. Taper sleeve 122 extends through axial bore 140 of interface 130 and accepts the ferrule of a patch cable 38, or optical device, interconnected to interface 30, thereby axially aligning divot 92 of inner post 84 with the optical fiber 142 of patch cable 38.

As seen in FIG. 7, connector 20 may be used to optically interconnect bare fiber 34 to patch cable 38 of ODTR 140. Connector 30 may also be used to optically interconnect to bare fiber 34 to patch cable 38 of power meter 141. A bare fiber 34 inserted through entrance aperture 48 of cartridge 50 along axis Y—Y will pick up a quantity of coupling compound 62 before exiting exit aperture of inner chamber 54. When inserted sufficiently far enough through connector 30 along axis Y—Y, the end of bare fiber 34 (and the quantity of coupling compound 62 thereon) will settle in divot 90 of inner post 84. As the optical fiber of patch cable 38 is seated in divot 92 on the opposing end of inner post 84, bare fiber 34 is optically interconnected to testing or optical equipment. Coupling compound 62 and divot 90 improve the quality of the optical connection, thereby avoiding the need to perfectly cleave bare fiber 34 to obtain sufficient transmission quality for testing or communication purposes. Connector 30 may include a clamping mechanism 22 to releasably retain bare fiber 34 once transmission quality has been optimized by rotating the fiber and testing transmissivity with optical testing equipment.

After a number of fibers 34 have been passed through cartridge 22, the amount of coupling compound 62 left therein may be insufficient to provide optical coupling of an un cleaved bare fiber. When this occurs, end cap 40 may be removed by unthreading it from bulkhead housing 100. Empty cartridge 50 may then be removed, and a replacement cartridge 50 containing a new supply of coupling compound 62 inserted back into position before replacing end cap 40. A narrow wire may be inserted through either side of connector 30 to remove debris or fiber fragment that reduces the optical capabilities of connector 30.

What is claimed is:

1. A connector for interconnecting a bare optical fiber to optical equipment, said connector comprising:
    a cartridge containing a predetermined quantity of optical fluid, said cartridge comprising an entrance aperture, an exit aperture, and an inner chamber for housing said optical coupling fluid;
    a ferrule in axial alignment with said cartridge for receiving a bare fiber passed through said cartridge, said ferrule including an inner post having a first end and a second end, and said first and second ends further include first and second divots formed therein, respectively, that are in optical communication with each other;
    a sleeve releasably engaged with said cartridge and said ferrule, wherein said sleeve axially aligns said exit aperture with said first divot; and
    an end cap including an opening formed in an end thereof, wherein said cartridge extends at least partially through said opening.

2. The connector of claim 1, further comprising a bulkhead housing having an axial bore engaging said second end of said inner post.

3. The connector of claim 2, further comprising an interface adapted for interconnection to fiber optic patch cable and engaged with said bulkhead housing, wherein said interface includes a port extending axially therethough.

4. The connector of claim 3, further comprising a second sleeve positioned in said axial bore of said housing and in said port of said interface, wherein said second sleeve is axially aligned with said second end of said inner post.

5. The connector of claim 4, wherein said end cap is threadably engaged with said bulkhead housing.

6. The connector of claim 5, further including a bare fiber extending through said cartridge and in optical communication with said first divot of said ferrule.

7. The connector of claim 6, further including a patch cable connected to said interface and engaging said second sleeve, wherein said patch cable includes a fiber core extending through said second sleeve and in optical communication with said second divot.

8. A ferrule for use in an optical fiber connector, comprising:
    an outer housing; and
    an inner post having a first end and a second end, wherein said first and second ends further include first and second divots formed therein, respectively, that are in optical communication with each other;
    wherein said outer housing defines first and second annular chambers extending around said first and second ends, respectively; and
    wherein said first and second annular chambers are adapted to receive first and second compression sleeves, respectively, for retaining said first and second ends of said inner post.

* * * * *